(12) United States Patent
Colaiacomo et al.

(10) Patent No.: US 10,592,404 B2
(45) Date of Patent: Mar. 17, 2020

(54) PERFORMANCE TEST OF SOFTWARE PRODUCTS WITH REDUCED DURATION

(71) Applicant: International Business Machines Corporation, Armonk, NY (US)

(72) Inventors: Giovanni L. Colaiacomo, Rome (IT); Roberto Pecoraro, Rome (IT); Pia Toro, Rome (IT); Ignazio F. Trovato, Rome (IT)

(73) Assignee: International Business Machines Corporation, Armonk, NY (US)

(*) Notice: Subject to any disclaimer, the term of this patent is extended or adjusted under 35 U.S.C. 154(b) by 166 days.

(21) Appl. No.: 15/446,114

(22) Filed: Mar. 1, 2017

(65) Prior Publication Data
US 2018/0253372 A1 Sep. 6, 2018

(51) Int. Cl.
*G06F 11/00* (2006.01)
*G06F 11/36* (2006.01)

(52) U.S. Cl.
CPC ........ *G06F 11/3692* (2013.01); *G06F 11/368* (2013.01); *G06F 11/3684* (2013.01); *G06F 11/3688* (2013.01)

(58) Field of Classification Search
CPC ............ G06F 11/3668; G06F 11/3672; G06F 11/3676; G06F 11/368; G06F 11/3684; G06F 11/3688; G06F 11/3692
See application file for complete search history.

(56) References Cited

U.S. PATENT DOCUMENTS 6,742,179 B2* 5/2004 Megiddo ............... G06F 8/4441
717/130
7,457,723 B2 11/2008 Zhu et al.
(Continued)

OTHER PUBLICATIONS

Hall et al., A Systematic Literature Review on Fault Prediction Performance in Software Engineering, 2012 IEEE, URL:http://ieeexplore.ieee.org/xpl/login.jsp?tp=&rnumber=6035727&url=http%3A%2F%2Fieeexplore.ieee.org%2Fxpls%2Fabs_all.jsp%3Farnumber%3D6035727, pp. 1276-1304.
(Continued)

*Primary Examiner* — Elmira Mehrmanesh
(74) *Attorney, Agent, or Firm* — Schmeiser, Olsen & Watts, LLP; William Hartwell (57) ABSTRACT

A method and system for testing performance of a software product. One or more complete executions of a performance test of corresponding versions of the software product are performed. The complete executions of the performance test identifies a steady state value of each performance parameter monitored during the performance test after each performance parameter has transitioned to a steady state during the performance test. A performance profile of the software product is determined according to the complete executions of the performance test. Partial executions of the performance test of corresponding further versions of the software product are performed, each partial execution having a partial duration preceding the steady state of each performance parameter. Corresponding results of the partial executions of the performance test are estimated according to the performance profile from corresponding partial trends of each performance parameter during the partial executions of the performance test.

20 Claims, 6 Drawing Sheets

(56) References Cited

U.S. PATENT DOCUMENTS

| | | | |
|---|---|---|---|
| 7,703,079 B1 | 4/2010 | Burrows et al. | |
| 8,108,849 B2 * | 1/2012 | Adolphson | G06F 8/4441 717/151 |
| 8,171,459 B2 | 5/2012 | Oja et al. | |
| 8,266,593 B2 | 9/2012 | Narayanan et al. | |
| 8,332,822 B2 * | 12/2012 | Nagappan | G06F 11/3616 717/124 |
| 8,429,459 B2 * | 4/2013 | Birakoglu | G06F 11/368 714/38.1 |
| 8,694,301 B1 * | 4/2014 | Portal | G06F 17/5009 703/13 |
| 8,819,492 B2 | 8/2014 | Dande et al. | |
| 8,881,125 B2 * | 11/2014 | Dickenson | G06F 8/443 717/158 |
| 9,058,428 B1 | 6/2015 | Siddiqui et al. | |
| 9,361,078 B2 * | 6/2016 | Gao | G06F 8/4441 |
| 9,456,019 B2 * | 9/2016 | Zhang | G06F 11/3419 |
| 2003/0014741 A1 * | 1/2003 | Megiddo | G06F 8/4441 717/158 |
| 2006/0224534 A1 * | 10/2006 | Hartman | G05B 13/027 706/15 |
| 2007/0220349 A1 * | 9/2007 | Zhu | G06F 11/3428 714/38.14 |
| 2011/0145795 A1 * | 6/2011 | Khanapurkar | G06F 11/3414 717/126 |
| 2014/0228979 A1 * | 8/2014 | Caldwell | G05B 13/048 700/29 |
| 2015/0227448 A1 | 8/2015 | Goel et al. | |
| 2017/0005904 A1 | 1/2017 | Sharma et al. | |

OTHER PUBLICATIONS

Cagatay Catal, Software Fault Prediction: A Literature Review and Current Trends, 2010 Elsevier Ltd., Retrieved from Internet on May 31, 2016, URL: http://www.sciencedirect.com/science/article/pii/S0957417410011681, 3 pages.

* cited by examiner

PERFORMANCE TEST OF SOFTWARE PRODUCTS WITH REDUCED DURATION

TECHNICAL FIELD

The present invention relates generally to the information technology field, and more specifically, to performance tests of software products.

BACKGROUND

Verification of correct operation of any software products is a very critical activity in any phase of their lifecycle. Particularly, in many situations it is important to verify that the software products perform as expected, for example, in terms of consumption of hardware and/or software resources (such as processing power) by the software products, which is very useful for several purposes such as, for example, to validate the software products, to predict the behavior of the software products in difference scenarios.

Some techniques have been proposed for estimating performance of software products. For example, a complexity analysis may be applied to any software product in an attempt to infer performance of the software product therefrom. Moreover, a contribution to an overall performance of the software product by different components thereof may be predicted by analyzing the effects of artificial performance degradations inserted into the software product.

A more accurate verification of performance of any software product is generally obtained by performing a corresponding performance test, so that one or more performance parameters of the software product (for example, its processing power consumption) are actually measured by running the software product in one or more reference scenarios.

SUMMARY

Embodiments of the present invention provide a method, and associated computer system and computer program product, for testing performance of a software product.

One or more processors of the computer system perform one or more complete executions of a performance test of corresponding versions of the software product. The complete executions of the performance test identify a steady state value of each performance parameter of at least one performance parameter monitored during the performance test after each performance parameter has transitioned to a steady state during the performance test, The one or more processors determine a performance profile of the software product according to the complete executions of the performance test. The performance profile models a complete trend of the at least one performance parameter during the complete executions of the performance test.

The one or more processors perform one or more partial executions of the performance test of corresponding further versions of the software product. Each partial execution of the performance test has a partial duration preceding the steady state of each performance parameter.

The one or more processors estimate corresponding results of the partial executions of the performance test according to the performance profile from corresponding partial trends of the at least one performance parameter during the partial executions of the performance test.

DETAILED DESCRIPTION

Execution of a performance test is relatively complex. Therefore, some techniques have been proposed aimed at simplifying the performance test. For example, when the performance test comprises repeated iterations (to provide results that are significant on the average), a test criteria may be used to limit the number of iterations.

However, each iteration of the performance test may be quite time consuming. Indeed, the performance test generally starts with a transient phase wherein the performance parameters change over time (because of a change of state caused by the start of the software product). For example, during the transient phase the performance parameters increase or decrease continuously (for example, with the processing power consumption that starts from a relatively high value caused by the operations required to initialize the software product and then decreases as these operations complete). At the same time, the performance parameters may have spikes; i.e., fast and short positive or negative peaks (for example, with the processing power consumption that increases briefly to perform specific operations). The values of the performance parameters in the transient phase are scarcely significant and are generally discarded. After some time, the performance test should reach a steady state wherein the performance parameters are substantially stationary; i.e., the values of the performance parameters fluctuate around a constant value (for example, with the processing power consumption that stabilizes to a value corresponding to the workload of the software product). The values of the performance parameters in the steady state represent the actual behavior of the software product, and then define the result of the performance test (in comparison with the performance test that instead fails if the steady state is not reached).

However, the recognition of the steady state (and then the determination of the result of the performance test) requires verifying that a corresponding stability condition (defined by the performance parameters remaining stationary) is fulfilled in a stability time-window long enough to establish the actual end of the transient phase with a sufficient degree of confidence. As a result, the overall duration of the performance test (given by the transient phase plus the stability time-window) is relatively long (for example, of the order of several hours or days).

As a consequence, a development time of the software product increases accordingly, which may be especially critical in case of a relatively short development cycle, wherein new versions (or builds) of the software product should be delivered with high frequency (e.g., up to every few days).

FIGS. 1A-1D show the general principles of embodiments of the present invention.

Figure 1A:
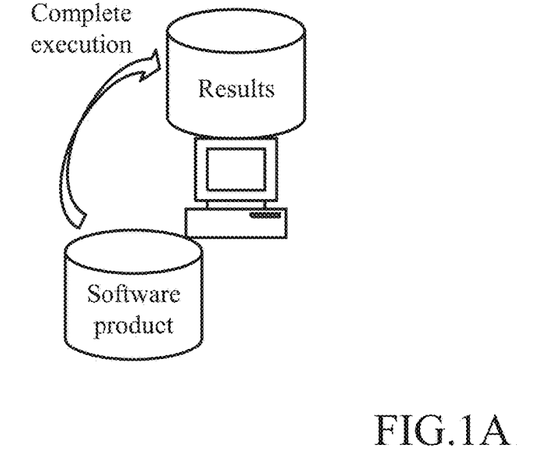
FIGS. 1A-1D show the general principles of embodiments of the present invention.

Starting from FIG. 1A, performance of a software product is tested (for different versions of the software product that are delivered over time). At the beginning, one or more complete executions of a performance test (of corresponding versions of the software product) are performed. The complete executions of the performance test provide corresponding results. Each result comprises one or more values of a performance parameter after a steady state thereof has been recognized (at the end of a transitory phase), which happens, for example, when a corresponding stability condition (defined by the performance parameter that remains stationary) is fulfilled in a corresponding stability time-window (for example, requiring 20-30 hours from the beginning of the performance test).

Figure 1B:
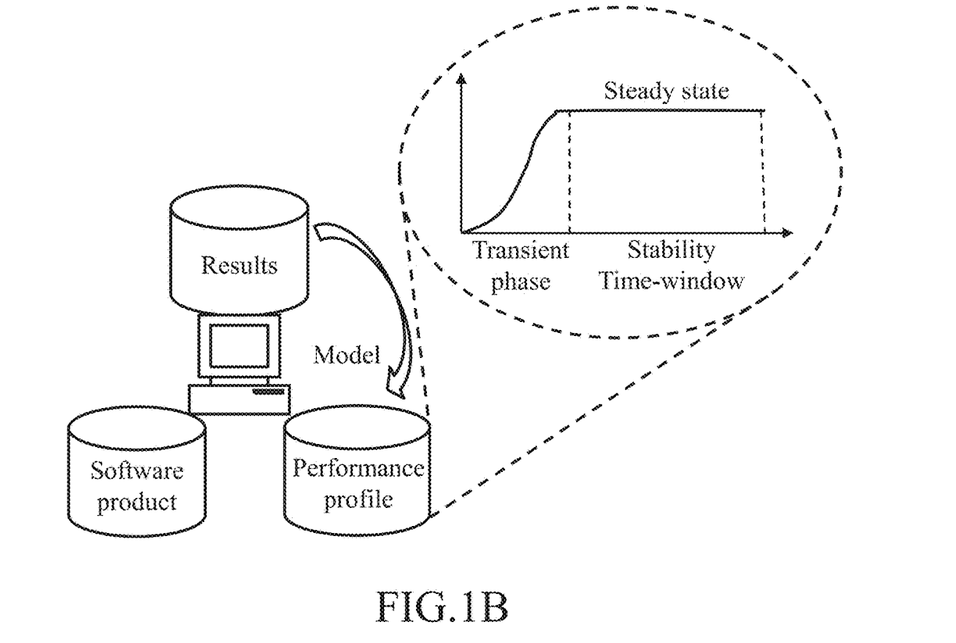

Moving to FIG. 1B, a performance profile of the software product is determined according to the complete executions of the performance test. The performance profile models a (complete) trend of each performance parameter during the complete executions of the performance test (with particular reference to the transient phase of the performance test). For example, as shown schematically in FIG. 1B, at the beginning the complete trend increases over time (during the transient phase) and then remains stationary at a constant value (in the steady state). The result of the performance test is given by the values of the performance parameters in the steady state, which may be determined only after the stability time-window from the end of the transient phase (once the steady state has been recognized by the fulfillment of the stability condition).

Figure 1C:
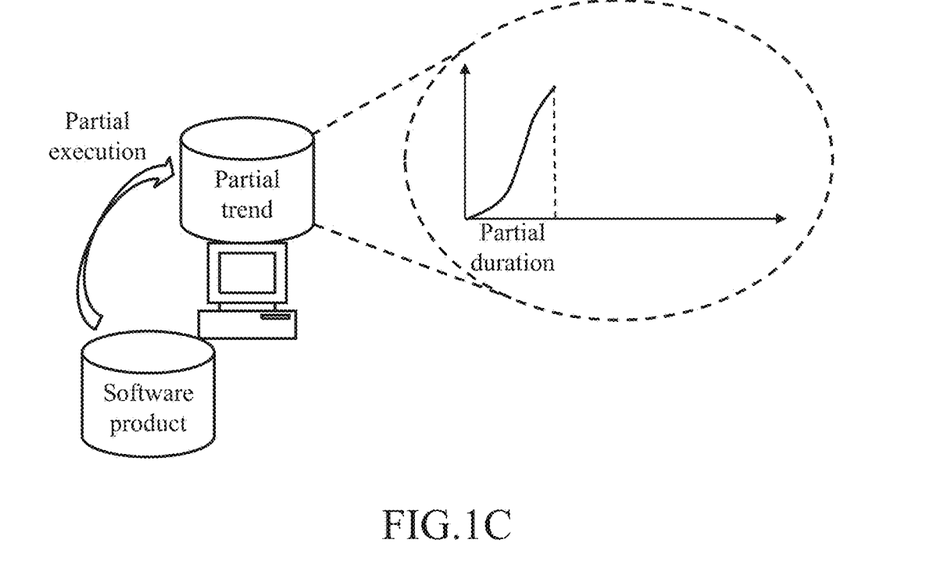

Moving to FIG. 1C, one or more partial executions of the performance test (of corresponding versions of the software product) are now performed. Each partial execution of the performance test has a (partial) duration that precedes the recognition of the steady state of the performance parameter (for example, 5-10 hours from the beginning of the performance test). At the same time, a (partial) trend of the performance parameter is determined (for example, by low-pass filtering the values of the performance parameter that are measured during the partial execution of the performance test).

Figure 1D:
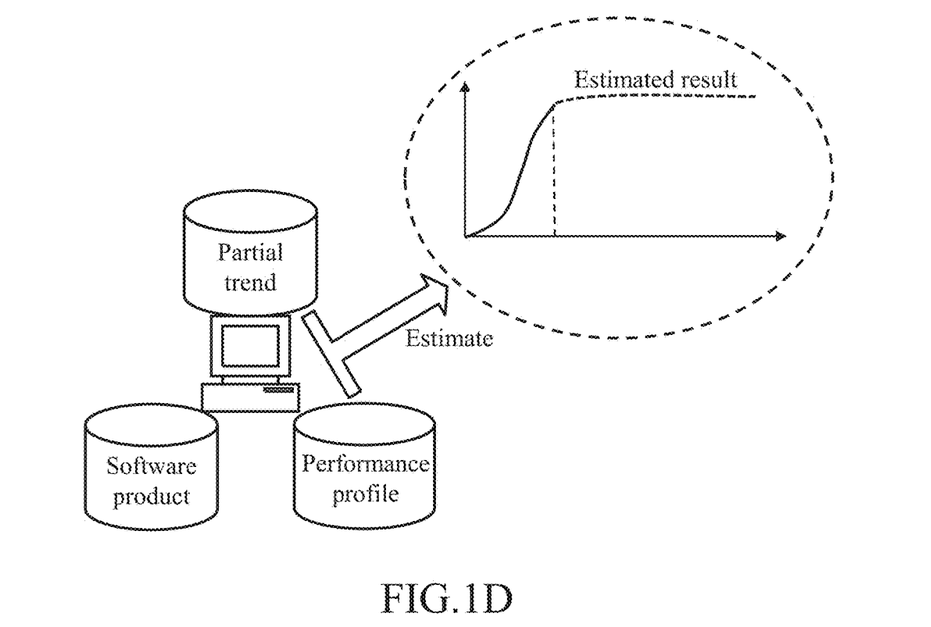

Moving to FIG. 1D, the result of each partial execution of the performance test is estimated from the partial trend of the performance test, according to the performance profile. For example, it is possible to assume that the partial trend would have continued in the same way as the performance profile. The value of the performance parameter corresponding to the steady state of the performance profile then defines the result of the performance test.

The above-described solution significantly shortens the duration of the performance test. Indeed, the result of the performance test may be estimated without waiting for completion of the performance test (i.e., the recognition of the steady state by the fulfillment of the stability condition). For example, it is possible to stop the performance test shortly after the partial trend has become stationary (without completing the stability time-window) or even when the partial trend is still increasing/decreasing.

As a consequence, a development time of the software product reduces accordingly, which is especially important in case of a relatively short development cycle by allowing delivering new versions (builds) of the software product with high frequency (e.g., up to every few days).

Figure 2:
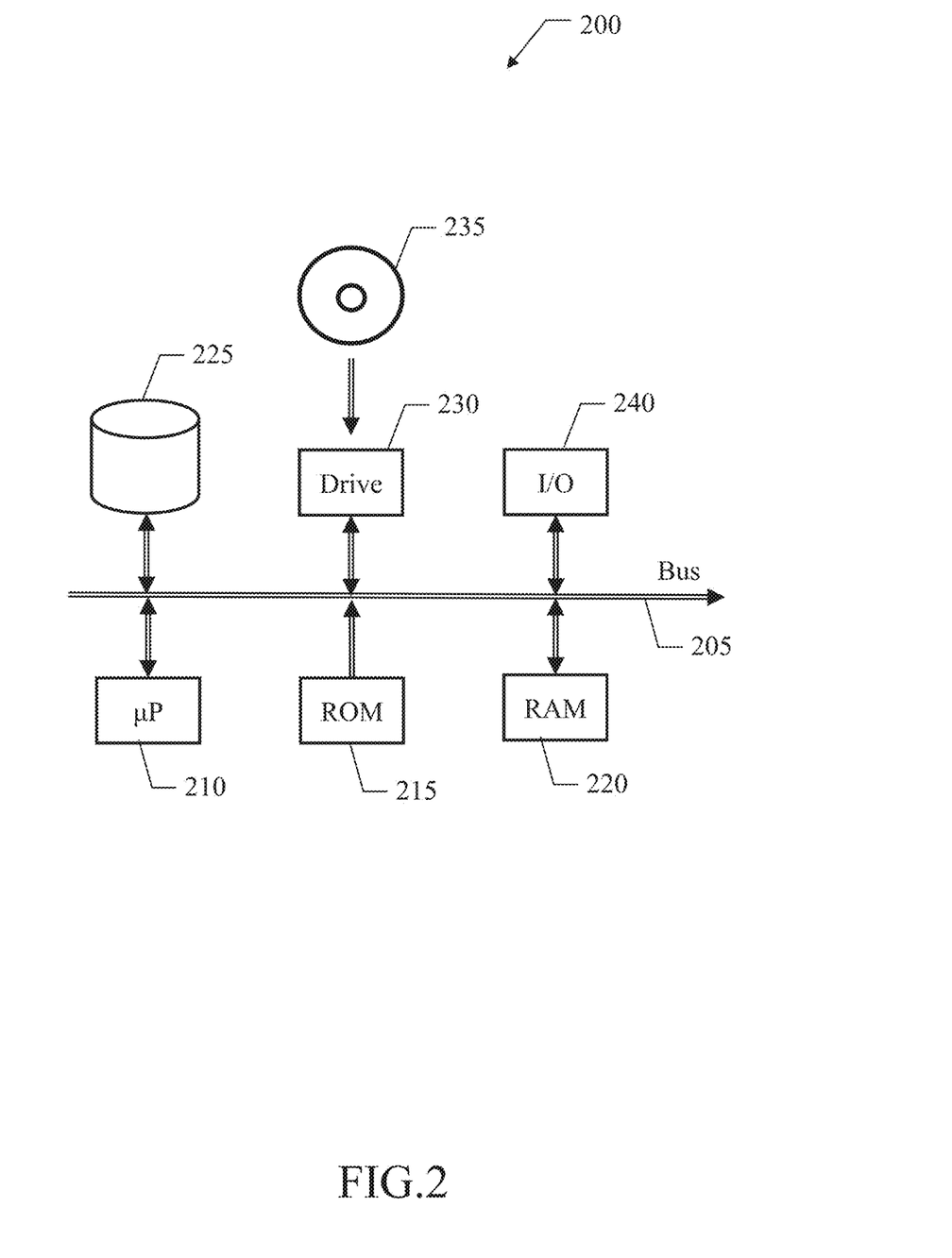
FIG. 2 shows a schematic block diagram of a computing system or computer in which embodiments of the present invention may be practiced.

FIG. 2 shows a schematic block diagram of a computing system or computer 200 in which embodiments of the present invention may be practiced.

For example, the computing system or computer 200 may be a Personal Computer (PC), or a computer. The computer 200 comprises several units that are interconnected through a bus structure 205. Particularly, one or more microprocessors (µP) 210 control operation of the computer 200. A non-volatile read only memory (ROM) 215 stores basic code for a bootstrap of the computer 200 and a volatile random access memory (RAM) 220 is used as a working memory by the microprocessors 210. The computer 200 is provided with a mass-memory for storing programs and data such as, for example, a hard disk 225 and a drive 230 for reading/writing removable storage units 235 (e.g., Digital Versatile Discs (DVDs)). Moreover, the computer 200 comprises a number of peripheral, or Input/Output (I/O), units 240. For example, the peripheral units 240 may comprise a keyboard and a mouse (for inputting commands and data), a monitor (for displaying information) and a network interface (for connecting the computer 200 to a communication network such as, for example, the Internet).

Figure 3:
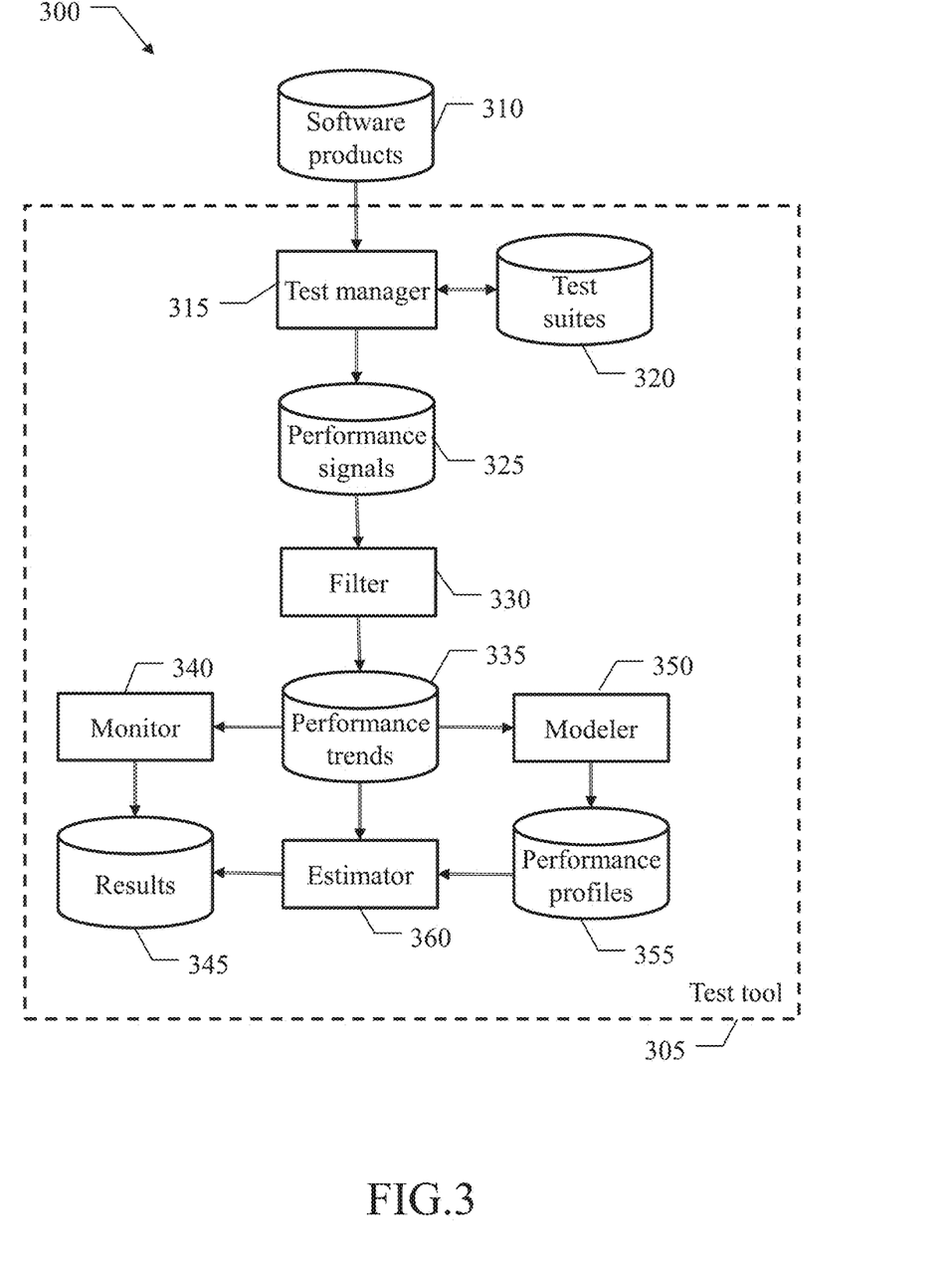
FIG. 3 shows software components that may be used to implement embodiments of the present invention.

FIG. 3 shows software components that may be used to implement embodiments of the present invention.

All the software components (programs and data) are denoted collectively with the reference 300. The software components are typically stored in the mass memory (e.g., 225, 235) and loaded (at least partially) into the working memory (e.g., RAM) of the computer when the programs are running, together with an operating system and other application programs (not shown in the FIG. 3). The programs are initially installed in the mass memory, for example, from removable storage units or from the communication network. In this respect, each program may be a module, segment or portion of code, which comprises one or more executable instructions for implementing embodiments of the present invention.

A test tool 305 is used to execute performance tests of different versions of one or more software products 310. The test tool 305 comprises the following components. A test manager 315 controls the execution of the performance tests. The test manager 315 accesses (in read mode) the software products 310. Moreover, the test manager 315 accesses (in read/write mode) a test case repository 320, which stores a test suite for each software product. The test suite comprises one or more test cases, each test case defining one or more actions to be performed on the software product for testing one or more corresponding performance parameters of the software product in a corresponding (reference) scenario. For example, the performance parameters may measure a consumption of hardware and/or software resources of the computer by the software product (such as processing power, working memory, mass memory), and a responsiveness of the software product (such as average values of response time, execution time, throughput of corresponding transactions). In this way, the performance test of different versions of each software product are executed in the same (test) conditions; i.e., in the same computer (or type thereof), in the same external conditions (for example, network connections, concurrent software products) and with the same inputs (as defined by the test suite). The test manager 315 accesses (in write mode) a performance signal repository 325, which stores a performance signal for each performance test. The performance signal tracks the values of the corresponding performance parameter that are measured over time during the execution of the performance test.

A filter 330 is used to determine a performance trend representing a trend of the performance signal of each performance test. The filter 330 accesses (in read mode) the performance signal repository 325. Moreover, the filter 330 accesses (in write mode) a performance trend repository 335 which stores an indication of the performance trend of each performance parameter (for example, represented by a corresponding parametric function). A monitor 340 is used to monitor the (complete) performance trend of each performance test to recognize the steady state of the corresponding performance parameter (as soon as the stability condition is fulfilled) and then to determine a result of the performance test (as defined by the value of the performance trend in the steady state). The monitor 340 accesses (in read mode) the performance trend repository 335. Moreover, the monitor 340 accesses (in write mode) a result repository 345 which stores the result of each performance test that has been executed over time for the different versions of each software product.

According to an embodiment of the present invention, a modeler 350 is used to determine a performance profile modeling the performance trends of each software product. The modeler 350 accesses (in read mode) the performance trend repository 335. Moreover, the modeler 350 accesses (in write mode) a performance profile repository 355 which stores the performance profile of each software product (together with the corresponding partial duration that has been determined for the partial executions of each software product's performance test). An estimator 360 is used to estimate the result of each partial execution of the performance test from the (partial) performance trend of the performance test according to the corresponding performance profile. Thus, the estimator 360 accesses (in read mode) the performance trend repository 335 and the performance profile repository 355. Moreover, the estimator 360 accesses (in write mode) the result repository 345.

Figure 4A:
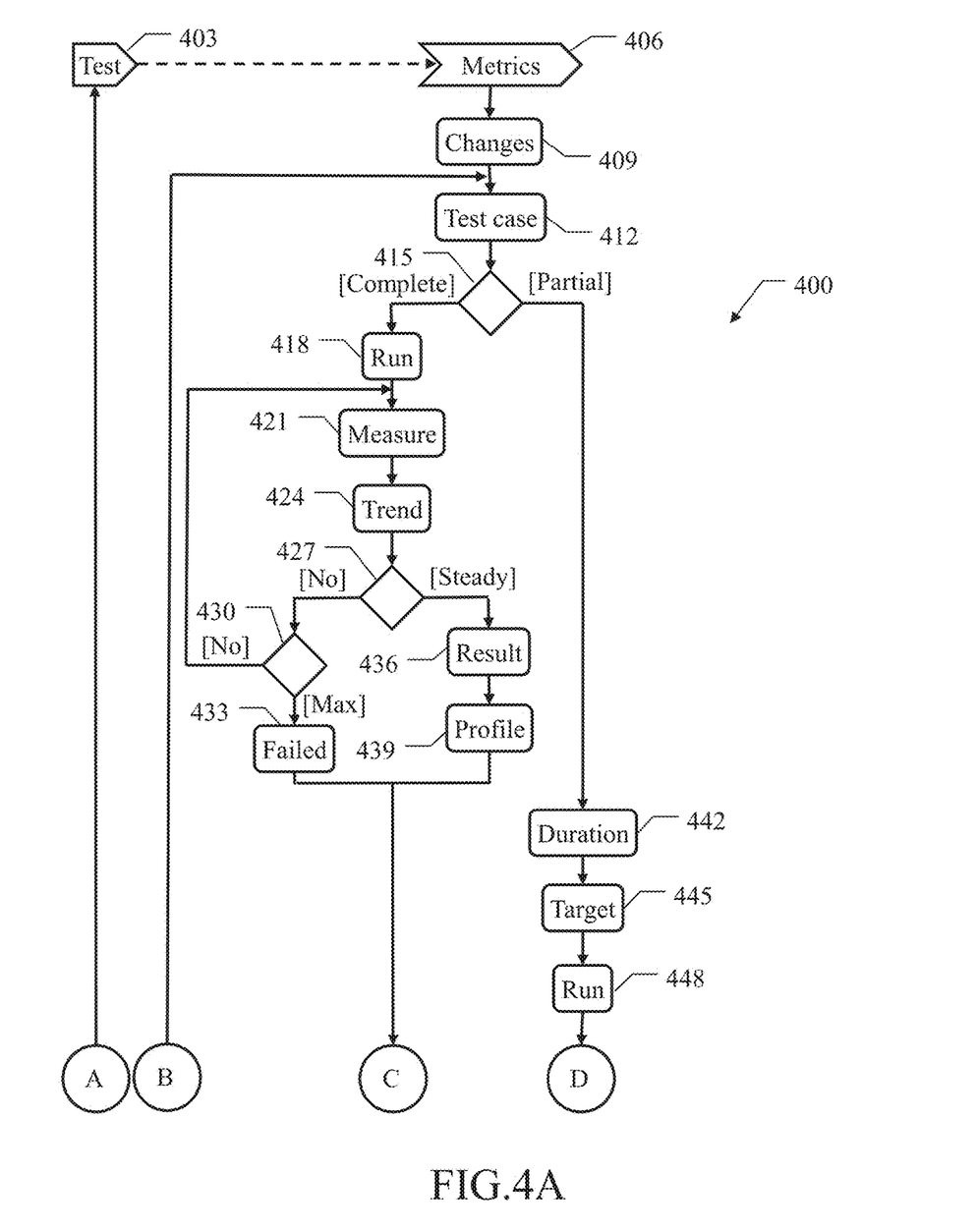
FIGS. 4A-4B show an activity diagram describing the flow of activities pertaining to implementation of embodiments of the present invention.
Figure 4B:
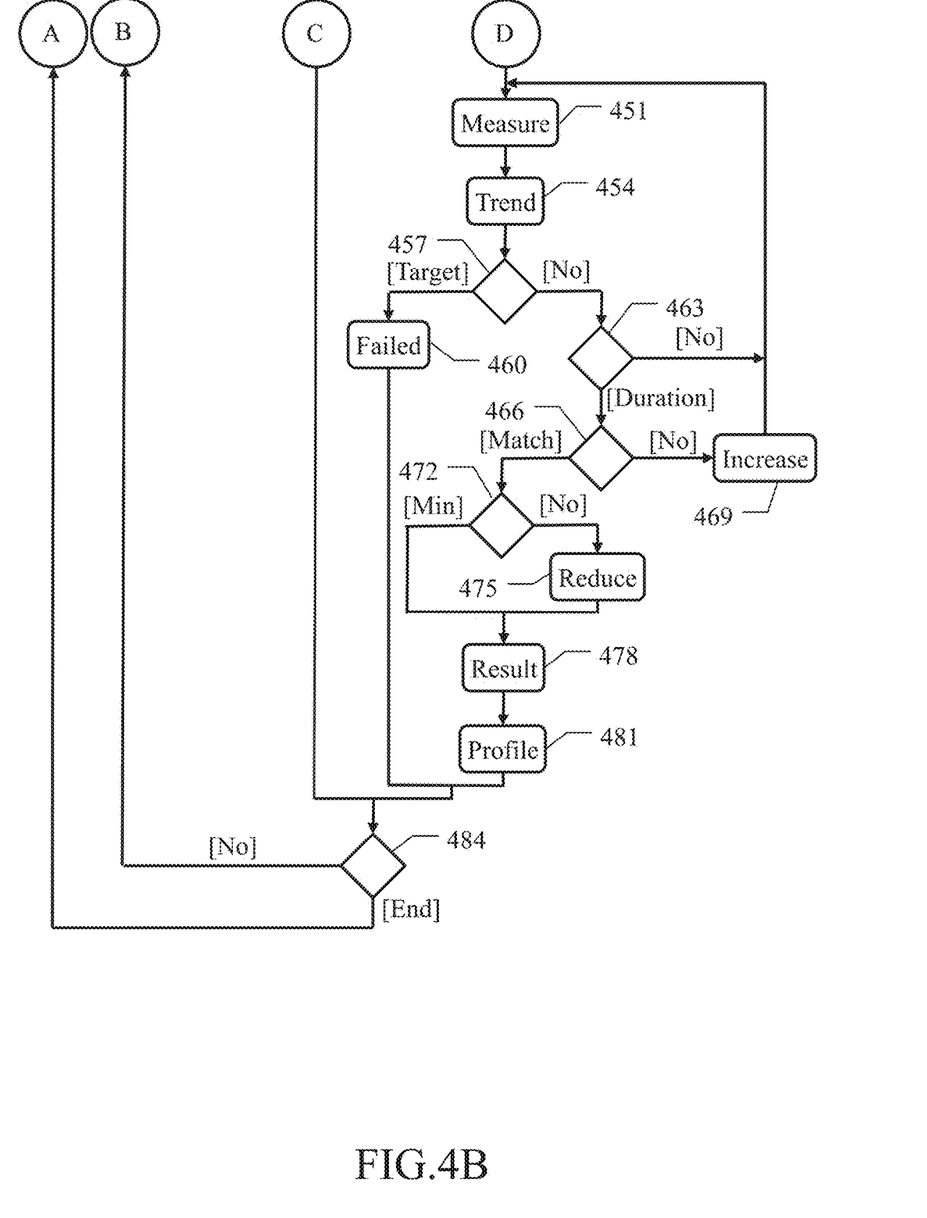

FIGS. 4A-4B show an activity diagram describing the flow of activities pertaining to implementation of embodiments of the present invention.

Particularly, FIGS. 4A-4B represent an exemplary process that may be used to perform performance tests of different versions of a generic software product with a method 400. In this respect, each block in FIGS. 4A-4B may correspond to one or more executable instructions for implementing the specified logical function on the computer.

The process passes from block 403 to block 406 as soon as a current version of the software program has to be tested (for example, according to a corresponding test plan). In response thereto, the test manager determines one or more software metrics of the current version of the software product that characterize the software product. The software metrics may be set manually (for example, by a tester that enters the metric's value in the test manager) or automatically. For example, in the latter case the test manager measures a complexity of the software product (such as cyclomatic complexity of the software product, number of classes of the software product) and/or size of the software product (such as number of source code lines of the software product, number of object code bytes of the software product). The test manager at block 409 then calculates a change indictor that indicates a change of the current version of the software product with respect to a previous version of the software product (if any). The change indicator is calculated according to a comparison of the software metrics of the current version with the software metrics of the previous version of the software product, determined in the same way during the performance test of the software product (for example, by an average difference in percentage in the software metrics). Continuing to block 412, the test manager retrieves the test suite of the software product (from the corresponding repository) and then takes a (current) test case thereof into account (starting from a first test case), which test case defines a performance test for the corresponding one or more performance parameters.

The flow of activity branches at block 415 according to the type (complete or partial) of the performance test. Particularly, the performance test is complete for a number of first versions of the software product required to determine the corresponding performance profile with an acceptable degree of confidence (for example, 5-10). This operation of the performance test may also be repeated (upon request by the tester) for any significant change of the software product (for example, a new release thereof), such that the process continues to block 418 wherein the test manager runs the performance test (by executing the actions indicated in the test case in succession).

Periodically (for example, every 10-100 ms) the test manager at block 421 measures the (current) value of the one or more performance parameters to be verified and adds this value to the performance test's performance signal (in the corresponding repository). Continuing to block 424, the filter 330 accordingly updates the corresponding (complete) performance trend (in the corresponding repository). For example, at first the filter may smooth the performance signal, in order to remove (or at least significantly reduce) short and fast positive/negative spikes therein (for example, by applying a median function). The filter may then apply a maximum or a minimum intensity projection algorithm to the (smoothed) performance signal (wherein the performance signal is held at the performance signal's maximum or minimum over time according to whether the performance signal is generally increasing or decreasing, respectively, in the transient phase), in order to remove (or at least significantly reduce) any strong variations thereof. In this way, the desired result is achieved in a simple and fast way.

With reference now to block 427, the monitor 340 verifies whether the stability condition is fulfilled, which happens when the performance trend remains at the same value in the stability time-windows (for example, 5-15 hours); i.e., its first derivative of the performance trend is substantially zero. If not, meaning that the steady state has not been recognized yet, the monitor at block 430 verifies whether a maximum duration of the performance test has been reached (for example, 50-100 hours). If not, the flow of activity returns to the block 421 to repeat the same operations continually. Conversely, as soon as the maximum duration has been reached (without recognizing the steady state), the monitor at block 433 sets the performance test as failed in the result repository (since the software product has become instable and then needs to be fixed). Referring back to the block 427, if the stability condition is fulfilled the steady state is recognized. In response thereto, the monitor at block 436 determines the result of the (passed) performance test as the current value of the performance parameter in the performance trend, and then saves the current value of the performance parameter in the corresponding repository. Continuing to block 439, the monitor updates the performance profile of the software program accordingly. For example, the performance profile is determined as an average of the available performance trends of the software products (relating to any version thereof that has been tested).

Referring back to the block 415, in the other situations (i.e., next versions of the software product after determination of the corresponding performance profile), the performance test is partial. In this case, the estimator at block 442 retrieves the partial duration of the performance test from the performance profile repository (initialized to the time required for recognizing the steady state in the performance profile). The estimator at block 445 estimates a performance target of the performance parameter corresponding to the partial duration. The performance target is calculated by evaluating the performance profile at the end of the partial duration, and then updating this value of the performance target according to the change indicator (for example, scaling this value of the performance target by a percentage thereof). Therefore, the performance target represents the value of the performance parameter that is expected at the end of the partial duration, taking into account the executions of the performance test on the previous versions of the software product and the change of the current version of the software product with respect thereto. Continuing to block 448, as above the test manager 315 runs the performance test (by executing the actions indicated in the test case in succession). Periodically, the test manager at block 451 measures the (current) value of the performance parameter to be verified and adds this current value of the performance parameter to the performance test's performance signal (in the corresponding repository). Continuing to block 454, the filter 330 accordingly updates the corresponding (partial) performance trend (in the corresponding repository).

With reference to block 457, however, the monitor now verifies whether the performance trend has reached the performance target (before the end of the partial duration), which, for example, happens when the current value of the performance trend (generally increasing or decreasing) becomes higher or lower, respectively, than the performance target and a remaining time before reaching the end of the partial duration is below a threshold (for example, 1-2 hours). If so, the monitor at block 460 sets the performance test as failed in the result repository. Thus, the performance trend tends to depart significantly from the performance profile, so that it is likely that the current value of the performance trend at the end of the partial duration will be not significant, which allows recognizing the failure of the performance test in advance (before the end of the partial duration), thereby saving further time. Moreover, this result is achieved in a very simple way (by a mere comparison of values). Referring back to the block 457, if the performance trend has not reached the performance target, the monitor at block 463 verifies whether the end of the partial duration has been reached. If not, the flow of activity returns to the block 451 to repeat the same operations continually. Conversely, as soon as the end of the partial duration has been reached, the estimator at block 466 verifies whether the performance trend matches the performance target which, for example, happens when a difference between the current value of the performance trend and the performance target is lower (in absolute value) than a threshold (for example, 1-5% of the performance target). If not, the partial duration might be too short for estimating the result of the performance test with an acceptable degree of accuracy. Therefore, the estimator at block 469 increases the partial duration by a delta value (for example, 30-60 minutes). The flow of activity then returns to the block 451 to continue the performance test (with the execution of the performance test that returns to be complete, not shown in FIG. 4B, once the partial duration reaches a total duration of the performance profile).

Referring back to the block 466, if the performance trend matches the performance target (meaning that it is possible to estimate the result of the performance test with an acceptable degree of accuracy), the estimator at block 472 verifies whether a minimum value of the partial duration has been reached, which, for example, happens when the immediately lower value of the partial duration has been found to be too short for a predefined number of consecutive times (for example, 1-3), or in any case when a safety value has been reached (for example, 40-60% of a duration of the transient phase in the performance profile). If not, the estimator at block 475 decreases the partial duration in the reference model repository by the same delta value (for a next partial execution of the performance test). The process then descends into block 478. The same point at block 478 is also reached directly from the block 472 if the minimum value of the partial duration has already been reached. At this point, the estimator calculates the values that are estimated for the performance parameter in the steady state according to the performance profile starting from the current value of the performance trend (for example, by increasing/decreasing the value of the performance profile in the steady state by a difference between the current value of the performance trend and the current value of the performance profile). Continuing to block 481, the estimator updates the performance profile as above.

The process flows to block 484 from the block 433, the block 439, the block 460 or the block 481. At this point (block 484), the test manager verifies whether a last test case has been run. If not, the flow of activity returns to the block 412 to repeat the same operations for a next test case. Conversely, once all the test cases have been run (thereby completing the test of the software product), the flow of activity returns to the block 403 waiting for a next test.

In order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, each numerical value should be read as modified by the term about (unless already done) and each range of numerical values should be intended as expressly specifying any possible number along the continuum within the range (comprising its end points). Moreover, ordinal or other qualifiers are merely used as labels to distinguish elements with the same name but do not by themselves connote any priority, precedence or order. The terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for testing performance of a software product. However, the method may test any type of performance (for example, load, stress, endurance) for any software product (for example, application, middleware, operating system).

In an embodiment, the method comprises performing one or more complete executions of a performance test. However, the complete executions of the performance test may be in any number (down to only one, performed only at the beginning or in any other situations, such as for every new release, service pack).

In an embodiment, the complete executions of the performance test are of corresponding versions of the software product. However, the versions may be of any type (for example, service levels, releases) and in any number (with one or more iterations of the complete execution of the performance test for each version).

In an embodiment, the complete executions of the performance test provide corresponding results each comprising a value of at least one performance parameter after recognizing a steady state thereof. However, the performance parameters may be in any number and of any type (for example, measuring consumption of any hardware and/or software resource, any responsiveness, different, additional or alternative characteristics relating to operation of the software product, such as warming of the computer, or any combination thereof). Moreover, the steady state of the performance trends may be recognized in any way (for example, when variation or the first derivative of the performance trend remains within a threshold) in any stability time-window.

In an embodiment, the method comprises determining a performance profile of the software product according to the complete executions of the performance test (which performance profile models a complete trend of said at least one performance parameter during the complete executions of the performance test). However, the performance profile may be determined in any way (for example, by weighting the performance trends decreasingly with age).

In an embodiment, the method comprises performing one or more partial executions of the performance test of corresponding further versions of the software product (with each of the partial executions of the performance test that has a partial duration preceding said recognizing the steady state). However, each partial duration may have any length (for example, at least equal to the transient phase or even shorter than the transient phase) and may be determined in any way (for example, statically or dynamically, directly or incrementally).

In an embodiment, the method comprises estimating corresponding results of the partial executions of the performance test according to the performance profile from corresponding partial trends of said at least one performance parameter during the partial executions of the performance test. However, each result may be estimated in any way (for example, by any extrapolation techniques, such as of linear, polynomial type).

In an embodiment, the method comprises updating the performance profile according to each of the partial trends. However, the performance profile may be updated according to every partial trend, only until a minimum partial duration is determined or never (with the performance profile that is determined only according to the complete trends in the latter case).

In an embodiment, the method comprises determining a change indictor of a change of each of the versions of the software product with respect to a corresponding previous version of the versions of the software product. However, the change indicator may be determined in any way (for example, manually, automatically, semi-automatically).

In an embodiment, the method comprises estimating the result of each of the partial executions of the performance test further according to the change indicator of the corresponding version of the software product. However, the change indicator may be taken into account in any way (for example, by updating the performance profile accordingly) or this feature may be omitted at all.

In an embodiment, said step of determining a change indictor comprises measuring one or more software metrics of each of the versions of the software product indicative of a complexity and/or a size thereof. However, the software metrics may be in any number and may indicate any complexity (for example, the number of functions), any size (for example, the number of modules), different, additional or alternative characteristics of the software product (for example, a number of connections thereto), or any combination thereof (for example, by averaging them according to different weights).

In an embodiment, said step of determining a change indictor comprises calculating the change indicator of each of the versions of the software product according to a comparison of the software metrics being measured for the version of the software product and for the corresponding previous version of the software product. However, the change indicator may be calculated according to any comparison (for example, by comparing each software metric individually and then combining the obtained results, by combining the software metrics of each version and then comparing combinations of the software metrics, according to the average, median, peak of the software metrics) or more generally in any other way (for example, by taking into account any number of preceding versions, possibly weighted decreasingly with age).

In an embodiment, said step of performing one or more partial executions of the performance test comprises determining the partial duration of each of the partial executions of the performance test according to a number of previous partial executions of said partial executions of the performance test. However, the partial duration may vary in any way according to the number of previous (total and/or partial) executions of the performance test, or even independent of previous executions of the performance test.

In an embodiment, the method comprises determining the partial duration of each of the partial executions of the performance test according to the change indicator of the corresponding version of the software product. However, the partial duration may vary in any way according to the change indicator (for example, based on the trend of the performance test, alone or in combination with the number of previous executions), or even independently of it.

In an embodiment, the method comprises (for each of the partial executions of the performance test) estimating a performance target for said at least one performance parameter according to the performance profile in correspondence to the partial duration of the partial execution of the performance test. However, the performance target may by estimated in any way (either the same or different with respect to the estimation of the results).

In an embodiment, the method comprises reducing the partial duration for a next partial execution of said partial executions of the performance test in response to a match of the partial trend in correspondence to the partial duration with the performance target. However, the match may be determined in any way (for example, tolerating any difference, down to none) and the partial duration may be reduced in any way accordingly (for example, with a decreasing pitch, in response to every match or only after two or more consecutive matches).

In an embodiment, said step of reducing the partial duration comprises reducing the partial duration at most to a minimum value. However, the minimum value may be of any type (for example, determined statically by any fixed or percentage value, dynamically by any converge condition, alone or in combination). In any case, the possibility is not excluded of reducing the partial duration as far as possible (without any minimum value thereof).

In an embodiment, the method comprises estimating the performance target for each of the partial executions of the performance test according to the change indicator of the corresponding version of the software product. However, the change indicator may be taken into account in any way (either the same or different with respect to the estimation of the results) or this feature may be omitted at all.

In an embodiment, the method comprises (for each of the partial executions of the performance test) incrementing the partial duration for the partial execution of the performance test in response to a mismatch of the partial trend in correspondence to the partial duration with the performance target. However, the partial duration may be incremented in any way (either the same or different with respect to its decrement), or different, additional or alternative operations may be performed in response to the mismatch (for example, stopping the performance test and setting the performance test as failed, re-determining the performance profile from the complete executions of the performance test when the failure happens after the minimum value of the partial duration has been determined).

In an embodiment, the method comprises (for each of the partial executions of the performance test) determining a failure of the partial execution of the performance test in response to the partial trend reaching the performance target before the partial duration. However, this failure may be determined in any way (for example, tolerating any difference, down to none, up to any time before the end of the partial duration, down to none). In any case, the departure from the performance profile may be monitored in any way, even without any performance target (for example, according to a trend of the difference over time between the partial trend and the performance target) or this feature may be omitted at all.

In an embodiment, the method comprises determining each of the complete trends and each of the partial trends by high-pass filtering values of the corresponding performance parameter being measured during the corresponding complete execution of the performance test or partial execution of the performance test, respectively. However, the complete and partial trends may be determined in any way, either the same or different (for example, with or without the smoothing of the performance signal, by curve fitting techniques).

Generally, similar considerations apply if the same solution is implemented with an equivalent method (by using similar steps with the same functions of more steps or portions thereof, removing some steps being non-essential, or adding further optional steps). Moreover, the steps may be performed in a different order, concurrently or in an interleaved way (at least in part).

An embodiment provides a computer program configured for causing a computing system to perform the above-mentioned method when the computer program is executed on the computing system. An embodiment provides a computer program product, the computer program product comprising a computer readable storage medium having program instructions embodied therewith, the program instructions being executable by a computing system to cause the computing system to perform the same method. However, the computer program may be implemented as a stand-alone module, as a plug-in for a pre-existing computer program (for example, the test tool), or even directly in it; moreover, the computer program may run on any computing system (see below). In any case, the solution according to an embodiment of the present disclosure lends itself to be implemented even with a hardware structure (for example, by electronic circuits integrated in one or more chips of semiconductor material), or with a combination of software and hardware suitably programmed or otherwise configured.

An embodiment provides a system comprising means configured for performing each of the steps of the above-mentioned method. An embodiment provides a system comprising a circuitry (i.e., any hardware suitably configured, for example, by software) configured for performing each of the steps of the same method. However, the system may be of any type (for example, any physical and/or virtual computing machine, either stand-alone or communicating with other computing machines via any local, wide area, global, cellular or satellite network and exploiting any type of wired and/or wireless connections).

Generally, similar considerations apply if the system has a different structure or comprises equivalent components or it has other operative characteristics. In any case, every component thereof may be separated into more elements, or two or more components may be combined together into a single element, moreover, each component may be replicated to support the execution of the corresponding operations in parallel. Moreover, unless specified otherwise, any interactivity between different components generally does not need to be continuous, and may be either direct or indirect through one or more intermediaries.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code executable by one or more processors of a computer system to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

In one embodiment, the computer or computer system may be or include a special-purpose computer or machine that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for testing performance of a software product, said method comprising:

performing, by one or more processors of a computer system, one or more complete executions of a performance test of corresponding versions of the software product, said complete executions of the performance test identifying a steady state value of each performance parameter of at least one performance parameter monitored during the performance test after each performance parameter has transitioned to a steady state during the performance test, determining, by the one or more processors, a performance profile of the software product according to the complete executions of the performance test, said performance profile modeling a complete trend of the at least one performance parameter during the complete executions of the performance test, performing, by the one or more processors, one or more partial executions of the performance test of corresponding further versions of the software product, each partial execution of the performance test having a partial duration preceding the steady state of each performance parameter, and estimating, by the one or more processors, corresponding results of the partial executions of the performance test according to the performance profile from corresponding partial trends of the at least one performance parameter during the partial executions of the performance test.

2. The method of claim 1, wherein the method comprises:
updating, by the one or more processors, the performance profile according to each partial trend of the partial trends.

3. The method of claim 1, wherein the method comprises:
determining, by the one or more processors, a change indictor of a change of each version of the versions of the software product with respect to a corresponding previous version of the versions of the software product, and further estimating, by the one or more processors, the result of each partial execution of the partial executions of the performance test according to the change indicator of the change of the corresponding version of the software product.

4. The method of claim 3, wherein said determining the change indictor of the change of each version comprises:
measuring one or more software metrics of each version of the software product indicative of a complexity and/or a size of each version, and calculating the change indicator of the change of each version of the software product according to a comparison of the software metrics being measured for each version of the software product and for the corresponding previous version of the software product.

5. The method of claim 1, wherein said performing one or more partial executions of the performance test comprises:
determining the partial duration of each partial execution of the partial executions of the performance test according to a number of previous partial executions of the partial executions of the performance test.

6. The method of claim 1, wherein the method comprises:
determining, by the one or more processors, a change indictor of a change of each version of the versions of the software product with respect to a corresponding previous version of the versions of the software product, and determining, by the one or more processors, the partial duration of each partial execution of the partial executions of the performance test according to the change indicator of the change of the corresponding version of the software product.

7. The method of claim 1, wherein the method comprises, for each partial execution of the performance test:
estimating, by the one or more processors, a performance target for the at least one performance parameter according to the performance profile in correspondence to the partial duration of the partial execution of the performance test, and reducing, by the one or more processors, the partial duration for a next partial execution of the partial executions of the performance test in response to a match of the partial trend, in correspondence to the partial duration, with the performance target.

8. The method of claim 7, wherein said reducing the partial duration comprises:
reducing the partial duration to no less than a minimum value of the partial duration.

9. The method of claim 7, wherein the method comprises:
determining, by the one or more processors, a change indictor of a change of each version of the versions of the software product with respect to a corresponding previous version of the versions of the software product, and estimating, by the one or more processors, the performance target for each partial execution of the partial executions of the performance test according to the change indicator of the change of the corresponding version of the software product.

10. The method of claim 7, wherein the method comprises, for each partial execution of the partial executions of the performance test:
incrementing, by the one or more processors, the partial duration for the partial execution of the performance test in response to a mismatch of the partial trend, in correspondence to the partial duration, with the performance target.

11. The method of claim 7, wherein the method comprises, for each of the partial executions of the performance test:
determining, by the one or more processors, a failure of the partial execution of the performance test in response to the partial trend reaching the performance target before the partial duration has elapsed.

12. The method of claim 1, wherein the method comprises:
determining, by the one or more processors, each complete trend of the complete trends or each partial trend of the partial trends by high-pass filtering values of the corresponding performance parameter being measured during the corresponding complete execution of the performance test or the corresponding partial execution of the performance test, respectively.

13. A computer program product, comprising one or more computer readable hardware storage devices having computer readable program code stored therein, said program code containing instructions executable by one or more processors of a computer system to implement a method for testing performance of a software product, said method comprising:

performing, by the one or more processors, one or more complete executions of a performance test of corresponding versions of the software product, said complete executions of the performance test identifying a steady state value of each performance parameter of at least one performance parameter monitored during the performance test after each performance parameter has transitioned to a steady state during the performance test, determining, by the one or more processors, a performance profile of the software product according to the complete executions of the performance test, said performance profile modeling a complete trend of the at least one performance parameter during the complete executions of the performance test, performing, by the one or more processors, one or more partial executions of the performance test of corresponding further versions of the software product, each partial execution of the performance test having a partial duration preceding the steady state of each performance parameter, and estimating, by the one or more processors, corresponding results of the partial executions of the performance test according to the performance profile from corresponding partial trends of the at least one performance parameter during the partial executions of the performance test.

14. The computer program product of claim 13, wherein the method comprises:

updating, by the one or more processors, the performance profile according to each partial trend of the partial trends.

15. The computer program product of claim 13, wherein the method comprises:

determining, by the one or ore processors, a change indictor of a change of each version of the versions of the software product with respect to a corresponding previous version of the versions of the software product, and further estimating, by the one or more processors, the result of each partial execution of the partial executions of the performance test according to the change indicator of the change of the corresponding version of the software product.

16. The computer program product of claim 15, wherein said determining the change indictor of the change of each version comprises:

measuring one or more software metrics of each version of the software product indicative of a complexity and/or a size of each version, and calculating the change indicator of the change of each version of the software product according to a comparison of the software metrics being measured for each version of the software product and for the corresponding previous version of the software product.

17. A computer system, comprising one or more processors, one or more memories, and one or more computer readable hardware storage devices, said one or more hardware storage device containing program code executable by the one or more processors via the one or more memories to implement a method for testing performance of a software product, said method comprising:

performing, by the one or more processors, one or more complete executions of a performance test of corresponding versions of the software product, said complete executions of the performance test identifying a steady state value of each performance parameter of at least one performance parameter monitored during the performance test after each performance parameter has transitioned to a steady state during the performance test, determining, by the one or more processors, a performance profile of the software product according to the complete executions of the performance test, said performance profile modeling a complete trend of the at least one performance parameter during the complete executions of the performance test, performing, by the one or more processors, one or more partial executions of the performance test of corresponding further versions of the software product, each partial execution of the performance test having a partial duration preceding the steady state of each performance parameter, and estimating, by the one or more processors, corresponding results of the partial executions of the performance test according to the performance profile from corresponding partial trends of the at least one performance parameter during the partial executions of the performance test.

18. The computer system of claim 17, wherein the method comprises:

updating, by the one or more processors, the performance profile according to each partial trend of the partial trends.

19. The computer system of claim 17, wherein the method comprises:

determining, by the one or more processors, a change indictor of a change of each version of the versions of the software product with respect to a corresponding previous version of the versions of the software product, and further estimating, by the one or more processors, the result of each partial execution of the partial executions of the performance test according to the change indicator of the change of the corresponding version of the software product.

20. The computer system of claim 19, wherein said determining the change indictor of the change of each version comprises:

measuring one or more software metrics of each version of the software product indicative of a complexity and/or a size of each version, and calculating the change indicator of the change of each version of the software product according to a comparison of the software metrics being measured for each version of the software product and for the corresponding previous version of the software product.

* * * * *